(12) United States Patent
Ikeda et al.

(10) Patent No.: US 7,876,169 B2
(45) Date of Patent: Jan. 25, 2011

(54) MODULATING CIRCUIT

(75) Inventors: Takeshi Ikeda, Ohta-ku (JP); Hiroshi Miyagi, Yokohama (JP)

(73) Assignee: Ricoh Co., Ltd., Tokyo (JP)

( * ) Notice: Subject to any disclaimer, the term of this patent is extended or adjusted under 35 U.S.C. 154(b) by 389 days.

(21) Appl. No.: 11/995,453

(22) PCT Filed: Feb. 8, 2006

(86) PCT No.: PCT/JP2006/302569

§ 371 (c)(1),
(2), (4) Date: Jan. 11, 2008

(87) PCT Pub. No.: WO2007/007440

PCT Pub. Date: Jan. 18, 2007

(65) Prior Publication Data

US 2009/0085687 A1    Apr. 2, 2009

(30) Foreign Application Priority Data

Jul. 13, 2005    (JP) ............................. 2005-204376

(51) Int. Cl.
*H03C 1/00*    (2006.01)
*H03C 3/00*    (2006.01)
(52) U.S. Cl. ....................................... 332/117; 332/120
(58) Field of Classification Search ......... 332/103–105,
332/117, 144, 149, 119–122
See application file for complete search history.

(56) References Cited

U.S. PATENT DOCUMENTS 5,903,609 A * 5/1999 Kool et al. .................. 375/261

6,133,804 A    10/2000 Wagner et al.
2005/0075815 A1* 4/2005 Webster et al. .............. 702/106

FOREIGN PATENT DOCUMENTS

| JP | 03-060502 | 3/1991 |
|---|---|---|
| JP | 08-023231 | 1/1996 |
| JP | 2002-516054 T | 5/2002 |
| JP | 2003-018231 | 1/2003 |
| WO | WO-99-30424 | 6/1999 |

OTHER PUBLICATIONS

Non-English language Office Action issued in related Japanese Application No. 2005-204376 (mailed Sep. 7, 2010).

* cited by examiner

*Primary Examiner*—David Mis
(74) *Attorney, Agent, or Firm*—Connolly Bove Lodge & Hutz LLP

(57) ABSTRACT

There are included a first quadrature modulation part (5) that divides an input signal into an I signal and a Q signal having a phase orthogonal to the phase thereof and uses a baseband frequency to perform frequency conversions of the I and Q signals, thereby performing a quadrature modulation; and a second quadrature modulation part (8) that uses in-phase and quadrature carriers of FM frequencies, which are 90 degrees out of phase with respect to each other, to perform frequency conversions of the I and Q signals, which are generated by the first quadrature modulation part (5), thereby performing a quadrature modulation. Thus, the phases of the I and Q signals, which are shifted by 90 degrees with respect to each other by the first quadrature modulation part (5), are further shifted by 90 degrees with respect to each other by the second quadrature modulation part (8), thereby providing frequency components the phases of which have been inverted, whereby the unwanted harmonic components at the spurious sides of a target frequency can be attenuated.

5 Claims, 1 Drawing Sheet

MODULATING CIRCUIT

CROSS REFERENCE TO RELATED APPLICATION

This application is a national stage application (under 35 U.S.C. §371) of PCT/JP2006/302569 filed Aug. 2, 2006, which claims benefit of Japanese Application No. 2005-204376 filed Jul. 13, 2005, disclosure of which is incorporated herein by reference.

TECHNICAL FIELD

The present invention relates to a modulating circuit, and is particularly suitable for use in a circuit for modulating a baseband signal to a radio high-frequency signal.

BACKGROUND ART

Generally, in order to transmit information as a wireless radio wave signal, conversion of a baseband signal (low frequency signal including components near a DC) into a radio high-frequency signal, so-called modulation processing is indispensable. There are roughly three modes of modulation. These three modes include an amplitude modulation (an AM for an analog modulation, and an ASK for a digital modulation) system in which an amplitude of a high-frequency signal (carrier) is changed by a baseband signal, a frequency modulation (an FM for an analog modulation, and an FSK for a digital modulation) system in which a frequency of a high-frequency signal is changed in proportion to a baseband signal, and a phase modulation (a PM in an analog modulation, and a PSK in a digital modulation) system in which a phase of a high-frequency signal is changed in proportion to a baseband signal.

Among these, the amplitude modulation is also called a linear modulation, since information on the amplitude and frequency which the baseband signal has is reproduced by the high-frequency signal as it is. On the other hand, since a spectrum of the modulated high-frequency signal is completely different from that of the baseband signal, the frequency modulation and phase modulation are also called nonlinear modulations. Heretofore, when wireless transmitting a stereo sound signal, the frequency modulation inherently immune to noise on a transmission line has been used (for example, Japanese Patent Laid-Open No. H9-321720, and Japanese Patent Laid-Open No. H7-162383 (patent documents 1 and 2)).

DISCLOSURE OF THE INVENTION

Generally, in a modulation system with frequency conversion, there is a problem of originally unnecessary components, such as image noise, arising in a frequency channel (spurious point) in a certain frequency relationship with a target frequency after frequency conversion. In particular, when there is no linearity in a voltage-to-frequency conversion characteristic of a modulator itself, many excessive harmonic components appear in side spurious of the target frequency in a modulation output, which becomes the same situation where the baseband signal has distortion.

The present invention is made in order to solve such problems, and aims at providing a modulating circuit which can reduce image noise generated on a spurious point at the time of frequency conversion.

In order to solve the problems mentioned above, the modulating circuit of the present invention includes a first quadrature modulation part which divides an input signal into an in-phase signal and a quadrature signal having a phase orthogonal to the phase of the in-phase signal and performs a quadrature modulation by performing frequency conversion of the in-phase and quadrature signals using a first frequency, and a second quadrature modulation part which performs a quadrature modulation by performing frequency conversion of the in-phase and quadrature signals, which are generated by the first quadrature modulation part, by using in-phase and quadrature carriers which have a second frequency which is higher than the first frequency, and whose phases are shifted by 90 degrees with respect to each other.

In another aspect of the present invention, a frequency offset part, which performs frequency conversion so as to provide a third frequency which is higher than the above-mentioned first frequency and lower than the above-mentioned second frequency by applying an offset to the frequency of the in-phase signal and quadrature signal which are generated by the first quadrature modulation part, is provided between the first quadrature modulation part and second quadrature modulation part, and the frequency offset part shifts the frequencies of the in-phase signal and quadrature signal by using in-phase and quadrature carriers whose phases are shifted by 90 degrees mutually.

In addition, here, although the first quadrature modulation part and the second quadrature modulation part are provided as a quadrature modulation part, a third quadrature modulation part may be further provided which performs a quadrature modulation by performing frequency conversion of the in-phase and quadrature signals, which are generated by the second quadrature modulation part, by using in-phase and quadrature carriers which have a frequency which is higher than the second frequency, and whose phases are shifted by 90 degrees with respect to each other. Similarly, a fourth quadrature modulation part, a fifth quadrature modulation part, and so on may be provided in post-stages of this third quadrature modulation part. When n quadrature modulation parts are provided, it is sufficient that a frequency of a carrier used in the quadrature modulation part in the final stage just become a target frequency.

According to the present invention constructed as described above, phases of the in-phase signal and quadrature signal whose phases have been shifted by 90 degrees are further shifted by 90 degrees at the time of frequency conversion in the subsequent stage so that it is possible to provide a phase-inverted frequency component, and hence, it is possible to attenuate excessive harmonic components in the side spurious of the target frequency. Thereby, it is possible to suppress image noise generated at the time of frequency conversion.

BEST MODE FOR CARRYING OUT THE INVENTION

Figure 1:
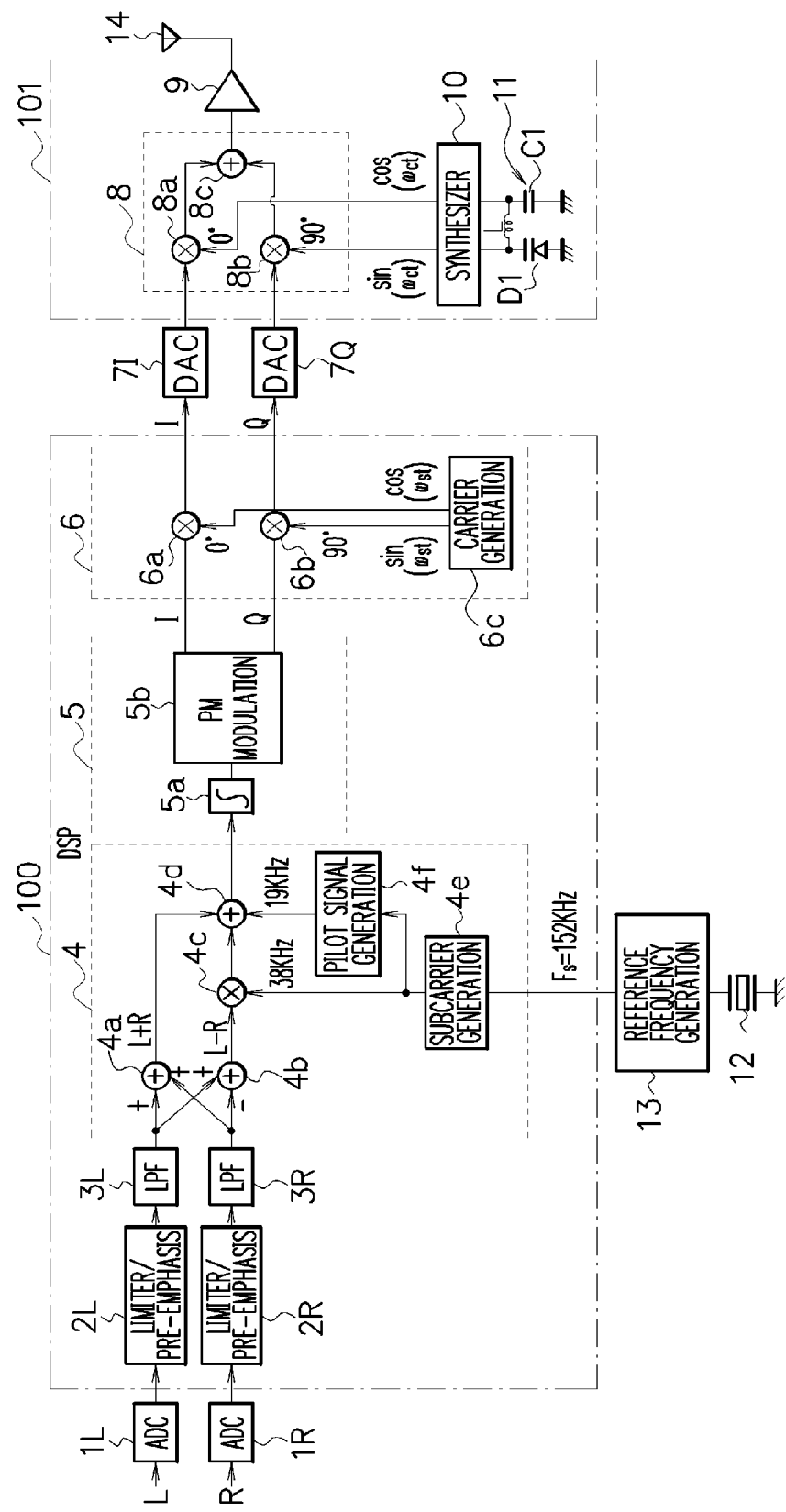
FIG. 1 is a diagram illustrating a structural example of a modulating circuit according to this embodiment.

An embodiment of the present invention will be explained below on the basis of a drawing. FIG. 1 is a diagram illustrating a structural example of a modulating circuit according to this embodiment. In FIG. 1, reference symbols 1L and 1R denote A/D converters (ADC), and convert an L channel signal and an R channel signal, which are inputted as analog signals, into digital signals respectively.

Reference symbols 2L and 2R denote limiter/pre-emphasis circuits, and perform processing of limiting amplitude, and processing for emphasizing a modulation factor of a high-frequency region to respective L channel signal and R channel signal which are inputted as digital signals from the A/D converters 1L and 1R. Reference symbols 3L and 3R are low-pass filters (LPF), and give band limitation to the L channel signal and R channel signal which are given amplitude limitation and high-frequency region emphasis.

Reference numeral 4 denotes a stereo signal generation part and generates a stereo composite signal from the L channel signal and R channel signal which pass the LPFs 3L and 3R. This stereo signal generation part 4 is constructed with being equipped with an adder 4a, a subtractor 4b, a balanced modulator 4c, an adder 4d, a subcarrier generator 4e, and a pilot signal generator 4f.

The adder 4a and subtractor 4b construct a matrix circuit, and convert the L channel signal and R channel signal, which are outputted from the LPFs 3L and 3R, into a sum signal (main signal) of L+R, and a difference signal (sub-signal) of L−R. The sum signal L+R generated here is outputted to the adder 4d, and the difference signal L−R is outputted to the balanced modulator 4c. The balanced modulator 4c performs amplitude modulation (AM) of a 38-kHz subcarrier signal, inputted from the subcarrier generator 4e, in a suppressed carrier mode by the difference signal L−R which is inputted from the subtractor 4b, and outputs its result as a sub-signal to the adder 4d.

The above-described subcarrier signal outputted from the subcarrier generator 4e is made into a half in a frequency by the pilot signal generator 4f, and is outputted as a 19-kHz pilot signal to the adder 4d. The adder 4d synthesizes the sum signal L+R outputted from the adder 4a, the difference signal L−R which is outputted from the balanced modulator 4c and which is given a balanced modulation, and the pilot signal outputted from the pilot signal generator 4f, and output its result as a stereo composite signal.

Reference numeral 5 denotes a first quadrature modulation part and is equipped with an integrator 5a and a PM modulator 5b for generation of an FM signal. The integrator 5a integrates the stereo composite signal outputted from the stereo signal generation part 4. The PM modulator 5b performs a PM modulation of the stereo composite signal, which is generated by the stereo signal generation part 4 and passes the integrator 5a, in a baseband frequency domain.

That is, the PM modulator 5b has sine table information of (sin $\omega_m t$), and cosine table information of (cos $\omega_m t$) on the basis of the baseband frequency, and divides the inputted stereo composite signal into an in-phase signal (I signal) and a quadrature signal (Q signal) which has a phase orthogonal to the I signal using these table information. Then, it performs a phase modulation of the I signal and Q signal which are divided in a baseband frequency domain. The baseband frequency used here is, for example, any one of 0 to 75 kHz.

In this way, when the stereo composite signal inputted from the stereo signal generation part 4 is integrated and a PM modulation is performed with the integrated signal, it means that an FM modulation of the stereo composite signal is performed. In addition, when removing the integrator 5a, it becomes possible to perform a PM modulation of the stereo composite signal. In addition, when removing the integrator 5a and providing an AM modulator instead of the PM modulator 5b, it is possible to perform an AM modulation of the stereo composite signal.

Reference numeral 6 denotes a frequency offset part and applies an offset to frequencies of the I signal and Q signal which are inputted from the first quadrature modulation part 5. The offset frequency applied here is 304 kHz or 1.92 MHz, for example. The frequency offset part 6 is equipped with a first mixer 6a, a second mixer 6b, and a carrier generator 6c.

The first mixer 6a shifts a frequency of the I signal with an in-phase (cos $\omega_s t$) carrier inputted from the carrier generator 6c. The second mixer 6b shifts a frequency of the Q signal with a quadrature (sin $\omega_s t$) carrier inputted from the carrier generator 6c. The frequency of the carrier used here is 304 kHz or 1.92 MHz.

The carrier generator 6c generates in-phase and quadrature carriers, for example, whose frequencies are 304 kHz, whose amplitudes are almost equal, and whose phases are shifted by 90 degrees mutually, and supplies the in-phase carrier to the first mixer 6a, and the quadrature carrier to the second mixer 6b. This carrier generator 6c also has sine table information and cosine table information, and generates a carrier of cos $\omega_s t$, and a carrier of sin $\omega_s t$ by using these table information.

By the way, when performing a quadrature modulation, it is necessary to generate the I signal and Q signal whose amplitudes are the same, and whose phases are shifted by 90 degrees, but it is hard to generate such I signal and Q signal by analog signal processing. This is because there are dispersion in elements, dispersion of delay, and the like in analog circuits, and hence, it is hard to accurately generate signals whose amplitudes are the same and whose phases are shifted by 90 degrees.

On the other hand, in this embodiment, the limiter/pre-emphasis circuits 2L and 2R, LPFs 3L and 3R, stereo signal generation part 4, and frequency offset part 6 with including the first quadrature modulation part 5 are constructed in a DSP (Digital Signal Processor) 100. When the DSP 100 performs modulation processing as digital signal processing in this way, it is easy to generate the I signal and Q signal whose phases are shifted accurately by 90 degrees, and it is easy to perform an IQ modulation.

In addition, a crystal oscillation circuit 12 and a reference frequency generator 13 exist in the external of this DSP 100. The crystal oscillation circuit 12 generates a signal at a predetermined frequency. The reference frequency generator 13 divides a frequency of the clock signal outputted from the crystal oscillation circuit 12 in a fixed frequency division ratio to generate a reference signal at a sampling frequency Fs. This sampling frequency Fs is 152 kHz, for example. The subcarrier generator 4e mentioned above divides this reference signal of sampling frequency Fs into one fourth equivalently to generate a 38-kHz subcarrier signal.

Reference symbols 7I and 7Q denote D/A converters (DACs), and convert into analog signals the I signal and Q signal which are inputted as digital signals from the frequency offset part 6, respectively.

Reference numeral 8 denotes a second quadrature modulation part and performs a quadrature modulation using the I signal and Q signal which are converted into the analog signals by the D/A converters 7I and 7Q. That is, in the second quadrature modulation part 8, a first mixer 8a modulates the I signal, supplied from the D/A converter 7I, with an in-phase (cos $\omega_c t$) carrier. A second mixer 8b modulates the Q signal, supplied from the D/A converter 7Q, with a quadrature (sin $\omega_c t$) carrier. A frequency of the carrier used here is a frequency of a 76-to-108-MHz FM frequency band, for example. An adder 8c synthesizes the I signal and Q signal, which are given quadrature modulations by the mixers 8a and 8b, to output the synthesized signal as a final stereo FM modulation signal.

Unlike the first quadrature modulation part 5 which is constructed in DSP 100, the second quadrature modulation part 8 achieves an IQ modulation as an analog circuit. Since it is necessary in the first quadrature modulation part 5 to make amplitudes and phases of the I signal and Q signal coincide accurately in order to perform a modulation in a low-frequency and wide-band baseband domain, the DSP 100 as digital signal processing is suitable. On the other hand, since modulation frequency is in a narrow-band and high-frequency of the FM frequency band in the second quadrature modulation part 8, accuracy of the amplitudes and phases of carriers is not requested than the case where the IQ modulation is performed in the baseband domain. Therefore, it is possible to construct the second quadrature modulation part 8 as an analog circuit.

Reference numeral 9 denotes an RF amplifier, amplifies the stereo modulation signal outputted from the second quadrature modulation part 8, and transmits it through an antenna 14. Reference numeral 10 denotes a synthesizer and generates the carriers supplied to the two mixers 8a and 8b in the second quadrature modulation part 8. That is, the synthesizer 10 generates in-phase and quadrature carriers whose amplitudes are almost equal, and whose phases are shifted by 90 degrees mutually, and supplies the in-phase carrier to the first mixer 8a, and the quadrature carrier to the second mixer 8b. Here, the synthesizer 10 includes a crystal oscillation circuit and a reference frequency generator therein, and generates carriers using these.

Reference numeral 11 denotes a load capacity value modification part, is equipped with a coil L, a variable capacitance diode D1, and a capacitor C1, and variably controls a frequency of the carriers generated by the synthesizer 10 by using the variable capacitance diode D1 concerned. An analog transmitting circuit 101 is constructed of the second quadrature modulation part 8, RF amplifier 9, synthesizer 10, and load capacity value modification part 11 which are mentioned above.

Alternatively, the synthesizer 10 may be adapted to generate the carriers by using the reference signal outputted from the reference frequency generator 13. When doing such a way, it is unnecessary to provide a crystal oscillation circuit and a reference frequency generator inside the synthesizer 10, and it is possible to share a set of crystal oscillation circuit 12, and reference frequency generator 13 between the DSP 100 and transmitting circuit 101.

All the configurations except the crystal oscillation circuit 12 (this is also included when the synthesizer 10 is equipped with a crystal oscillation circuit) are integrated into one chip in CMOS process among respective configurations illustrated in FIG. 1. In addition, although illustration is omitted in FIG. 1, memory (e.g., ROM, EEPROM, other semiconductor memory, etc.) which stores a program for controlling an operation of the DSP 100 is provided in the external of the DSP 100. This memory may be integrated into one chip with other configurations.

As illustrated in the above-mentioned FIG. 1, in this embodiment, a modulation is performed in three-step separation with providing a first quadrature modulation part 5 which performs an IQ modulation in a 0-to-75-kHz baseband frequency domain, a frequency offset part 6 which applies the offset frequency of 304 kHz or 1.92 MHz, and a second quadrature modulation part 8 which performs an IQ modulation in an FM frequency domain.

Then, it is possible to attenuate excessive harmonic components in the side spurious of the target frequency by providing phase-inverted frequency components by making phases of the I signal and Q signal, which are generated with their phases being shifted by 90 degrees in the first quadrature modulation part 5, further shifted by 90 degrees in the frequency offset part 6. Thereby, it is possible to suppress image noise, generated when the offset of 304 kHz or 1.92 MHz is applied to the frequency of 0 to 75 kHz.

In addition, it is possible to attenuate excessive harmonic components in the side spurious of the target frequency by providing phase-inverted frequency components by making phases of the I signal and Q signal, which are generated with their phases being shifted by 90 degrees in the frequency offset part 6, further shifted by 90 degrees in the second quadrature modulation part 8. Thereby, it is possible to suppress image noise generated when frequency conversion is performed to an FM frequency from 304 kHz or 1.92 MHz.

Furthermore, although the example of performing frequency conversion of the baseband frequency to the FM frequency gradually with separation into three steps of the first quadrature modulation part 5, frequency offset part 6, and second quadrature modulation part 8 is described in the above-mentioned embodiment, it does not limit to this. For example, the frequency offset part 6 may not exist. In addition, the quadrature modulation part may be provided in not only two steps but also three steps or more.

Moreover, although the above-mentioned embodiment describes the example of performing an FM modulation of the stereo composite signal, a signal to be modulated is not limited to the stereo signal. For example, it may be a monophonic signal. In addition, a modulation system of a signal is not limited to an FM modulation. For example, it may be an AM modulation or a PM modulation.

In addition, as for the second quadrature modulation part 8, although the example constructed of an analog circuit is described in the above-mentioned embodiment, when using high-performance DSP which can operate with a super-high-speed clock corresponding to an FM frequency, it is also possible to perform an IQ modulation according to the second quadrature modulation part 8 as digital signal processing in the DSP 100.

Furthermore, all the above-mentioned embodiments are only what show specific examples at the time of implementing the present invention, and the technical scope of the present invention must not be restrictively interpreted by these. That is, the present invention can be implemented in various forms without deviating from its spirit or its main features.

INDUSTRIAL APPLICABILITY

The present invention is useful to a modulating circuit for modulating a baseband signal to a radio high-frequency signal.

The invention claimed is:
1. A modulating circuit, comprising:
a stereo signal generation part which synthesizes a sum signal of an L-channel signal and an R-channel signal, a difference signal of the L-channel signal and the R-channel signal, and a pilot signal, and outputs its result as a stereo composite signal;
a first quadrature modulation part which divides the stereo composite signal into an in-phase signal and a quadrature signal having a phase orthogonal to the phase of the in-phase signal and performs a quadrature modulation by performing frequency conversion of the in-phase and quadrature signals using a first frequency; and
a second quadrature modulation part which performs a quadrature modulation by performing frequency conversion of the in-phase and quadrature signals, which are generated by the first quadrature modulation part, by using in-phase and quadrature carriers which have a second frequency which is higher than the first frequency, and whose phases are shifted by 90 degrees with respect to each other.

2. The modulating circuit according to claim 1, further comprising a frequency offset part between the first quadrature modulation part and the second quadrature modulation part:
the frequency offset part performs frequency conversion so as to provide a third frequency which is higher than the first frequency and lower than the second frequency by applying an offset to the frequency of the in-phase signal and quadrature signal which are generated by the first quadrature modulation part;
wherein the frequency offset part shifts the frequency of the in-phase signal and quadrature signal by using in-phase and quadrature carriers whose phases are shifted by 90 degrees mutually.

3. The modulating circuit according to claim 1,
the first quadrature modulation part is constructed in digital circuits, and the second quadrature modulation part is constructed in analog circuits.

4. The modulating circuit according to claim 2,
the first quadrature modulation part and the frequency offset part are constructed in digital circuits, and the second quadrature modulation part is constructed in analog circuits.

5. The modulating circuit according to claim 1,
the first frequency is a baseband frequency.

* * * * *